United States Patent
Van Herp et al.

(10) Patent No.: US 12,232,071 B2
(45) Date of Patent: Feb. 18, 2025

(54) METHOD, SYSTEM AND COMPUTER PROGRAM FOR REGISTERING USAGE DATA OF A DEVICE AND PEOPLE IN A BUILDING

(71) Applicant: BOEKIT B.V., Boxtel (NL)

(72) Inventors: Petrus Joannes Wilhelmus Van Herp, Boxtel (NL); Johannes Hermanus Petrus Maria Donk, Boxtel (NL)

(73) Assignee: BOEKIT B.V., Boxtel (NL)

( * ) Notice: Subject to any disclaimer, the term of this patent is extended or adjusted under 35 U.S.C. 154(b) by 0 days.

(21) Appl. No.: 17/768,795

(22) PCT Filed: Oct. 14, 2020

(86) PCT No.: PCT/NL2020/050631
§ 371 (c)(1),
(2) Date: Apr. 13, 2022

(87) PCT Pub. No.: WO2021/075960
PCT Pub. Date: Apr. 22, 2021

(65) Prior Publication Data
US 2024/0107482 A1    Mar. 28, 2024

(30) Foreign Application Priority Data

Oct. 14, 2019   (NL) ..................................... 2024015

(51) Int. Cl.
*H04W 60/04*   (2009.01)
*H04W 76/10*   (2018.01)
*H04W 84/18*   (2009.01)

(52) U.S. Cl.
CPC .......... *H04W 60/04* (2013.01); *H04W 76/10* (2018.02); *H04W 84/18* (2013.01)

(58) Field of Classification Search
None
See application file for complete search history.

(56) References Cited

U.S. PATENT DOCUMENTS

2009/0195349 A1 *   8/2009   Frader-Thompson ...................... G01D 4/002
340/3.1
2013/0318519 A1   11/2013   Coolidge
(Continued)

FOREIGN PATENT DOCUMENTS

GB    2472204   *   2/2011   ............... G01D 4/00
GB    2550326 B     4/2020
(Continued)

OTHER PUBLICATIONS

International Search Report mailed Jan. 28, 2021 for PCT/NL2020/050631.

*Primary Examiner* — Kenneth B Wells
(74) *Attorney, Agent, or Firm* — Suiter Swantz IP

(57) ABSTRACT

The present invention relates to a method for registering usage data of a device in a building, comprising the steps of: establishing a local wireless connection with a communication module of the device, the wireless connection being a Wireless Personal Area Network, WPAN, connection compliant; defining a usage event of the device, including at least location data, time data, state data, and user data; establishing a remote wireless connection with a remote central data processing unit for logging the usage event in a usage database, the remote wireless connection comprising a data connection over a mobile telecommunications network and/or a data connection over a WLAN connection; and wherein forwarding the device usage event to the remote central data processing unit is initiated after the device usage event is defined.

17 Claims, 2 Drawing Sheets

(56) References Cited

U.S. PATENT DOCUMENTS

2014/0350874 A1\* 11/2014 Lin ................. G01D 4/006
  702/62
2019/0260604 A1    8/2019 Wouhaybi et al.

FOREIGN PATENT DOCUMENTS

WO    WO 2015/086055    \*  6/2015  ............ G06Q 10/06
WO         2017066425 A1    4/2017

\* cited by examiner

METHOD, SYSTEM AND COMPUTER PROGRAM FOR REGISTERING USAGE DATA OF A DEVICE AND PEOPLE IN A BUILDING

TECHNICAL FIELD AND BACKGROUND

The present invention relates to a method of registering usage data of a device and people in a building.

The present invention further relates to a system and a computer program for registering such usage data of a device in a building.

The average number of devices that we have at home has increased significantly in recent years. This is not only true at home, but also in commercial spaces, offices, public facilities, etc. wherein the number of devices is increasing.

These devices are also getting smarter, which means that they collect more information and can also take actions based on information. These devices also tend to generate more and more data. In recent years, the trend has continued to store this data. This can be done locally or remotely in a cloud-based storage location.

Processing and communicating data also presents challenges. The amount of data increases to such an extent that its manageability is challenging, both in communication thereof and in processing. Extracting useful information from the bulk of data becomes more and more difficult as data grows. In addition, additional hardware will be required to facilitate communication of this data to cloud-based storage locations. The purchase, installation, configuration and maintenance of such systems takes a lot of time and money.

Moreover, much of the information is collected from various devices, and these devices are not all designed to set up communication channels that are designed to forward these high amounts of information or data. Sending all this data causes an unwanted allocation of bandwidth and, moreover, such intensive communication consumes a lot of energy. This makes the application limited. After all, for devices that depend on a battery for energy supply, it is necessary that the energy consumption is as low as possible.

BRIEF SUMMARY

It is therefore an object of the present invention to provide an improved method and system for registering usage data of a device in a building.

The present invention has a further object to provide an improved method and system for recording usage data of a device in a building whereby useful information about the usage of the device can be obtained without the need for additional hardware in the building.

Another object of the present invention is to provide an improved method and system for recording usage data of a device in a building where useful information about the usage of the device can be obtained with a minimal amount of energy.

To this end, the invention proposes in a first aspect a method of registering usage data of a device in a building, comprising the steps, performed in a mobile communication device, of:

establishing a local wireless connection with a communication module of the device, the wireless connection comprising a Wireless Personal Area Network, WPAN, compliant connection;

defining a usage event of the device, comprising at least location data, time data, state data, and user data;

establishing a remote wireless connection with a remote central data processing unit for logging the usage event in a usage database, the remote wireless connection comprising a data connection over a mobile telecommunications network and/or a data connection over a WLAN connection; and wherein forwarding the device usage event to the remote central data processing unit is initiated after the device usage event is defined.

In the context of the invention, devices are understood to mean a device such as a household appliance, a cleaning device, a sales device, a lamp or a sensor system or other device that is fixed, mobile, temporary or permanent in a building.

Such devices are equipped with a communication module. This communication module is preferably already present in the device, but can also be added later, for example as an additional add-on module, or in the form of a stand-alone communication module that can be used for several devices. The communication module is at least designed for communication with a mobile communication device. This mobile communication device is, for example, a mobile phone of the user of the device.

The mobile communication device includes both a processing module and a communication module. The communication module can communicate in at least two ways, short and long distance. That is, the short range communication is a wireless connection to the device over a Wireless Personal Area Network, WPAN, compliant connection. An example of this is a Bluetooth connection, more particularly a Bluetooth LE connection. The long distance connection is a remote wireless connection, which means that communication can be carried out with a remote central data processing unit, whereby the connection is a data connection over a mobile telecommunication network such as a 3G, 4G, 5G or other mobile cellular network. and/or a data connection over a WLAN connection. In the latter case, the mobile communication device will connect wirelessly to a local WLAN that allows further wired or wireless connection to the remote central data processing unit.

The data is ultimately collected in the remote central data processing unit, for example one or more servers. However, the way in which this data is received differs from the currently known method of data collection for such usage records. In currently known solutions, all or much of the data generated locally by the device is forwarded to the central server. The data is then processed there so that useful information about its use is obtained. In the context of the invention, this is understood to mean that information can be determined which is required, for example, for payment for use or consumption of the apparatus. In the example of a household appliance or a cleaning appliance, a user who does not own the appliance could pay for the use thereof based on a correction determination of that usage. This cannot or can hardly be determined with the currently known usage registration system. After all, indirect information is used for this, for example a separate transaction that precedes the use. This can be a user who pays for a chosen time period before or after. Whether the device was actually used during that period of time cannot be determined in this way.

Also, cleaning services that use cleaning equipment that are not owned can pay for for this equipment based on usage. It is not only important for the owner of the device to obtain useful information about real use of the device. The client of the work also needs useful user information. He wants to know, for example, when the device was used, and whether it was used in a manner as agreed. This means that, for example, a mopping device must always be in a certain position. However, this can differ per location. For example, a mop should be used for extra cleaning in places where people walk a lot. Thus, there is a need not only to get information that a device has been used, but also where, and how.

The maintenance of buildings is often carried out by large companies, including the cleaning thereof. Such companies employ a lot of staff. Because many staff work independently or in small teams, there is a great need to gain insight into the usage data of the equipment by the various staff members. In order to manage the staff, it is desirable to provide insight into outliers in use. This could be an indicator that something is going on here. If it is determined that a user uses a particular device for an exceptionally long time, this may be a sign that the user is unable to perform the work within a set standard. This may be a sign that the user has health problems, which can be precautionary measures.

The usage registration system according to the invention is able to obtain such useful information in that the system stores location data, time data, status data, and user data. From this combination of data, all the above useful insights into use can be extracted.

Registering the location data, time data, state data, and user data, however, yields a large amount of data. If that data were to be sent to the remote server, an almost continuous connection will have to be set up, over which data is continuously exchanged. This creates undesirable pressure on network capacity and energy consumption. Some devices depend on batteries for energy supply, in which case minimal use of the communication module is highly desirable. According to the invention, the user's mobile phone (mobile communication device) is used to reduce the amount of communication. An application in the mobile phone collects the location data, time data, state data, and user data and will communicate them to the server in the form of a usage event. Only when it has been determined that a usage event has been completed will the communication link be established. This results in significant savings in the required network capacity and energy consumption.

The mobile phone has multiple predetermined routines to determine that a usage event has been completed. This can be prompted, for example, by a change in one or more of the location data, time data, status data, and user data. More in particular, this may be due to the fact that a certain period of time has been exceeded, a certain location is left, a certain location is entered, a certain state of the device is detected, a user logs in or out, or a combination of these.

Some of the aforementioned data is determined by and in the device, for example the mop device. This is for example the state of the device such as a standby state, active state, setting of the device, etc. The location can also be determined in the device, if this device is equipped for this. This is the case, for example, if it contains a location determination module that determines the current and real position on the basis of GPS and/or on the basis of various telecommunication nodes. However, this information can also be determined by the mobile telephone, for instance by a GPS module present therein, and/or on the basis of one or more detected wireless networks or cellular communication towers.

Preferably, the usage event is determined based on a condition of the device. This state can include a standby state and an active state. In order to determine in which state the device is, the communication module of the device is preferably provided with a vibration or motion sensor. When it detects a movement, it can be determined that the device is in an active state.

In case the usage event is determined based on a state of the device, such as a standby state_or an active state, the step of establishing a local wireless connection between the communication module of the device and the mobile communication device can (e.g. a smartphone) may also be initiated by the device, the wireless connection comprising a Wireless Personal Area Network, WPAN, compliant connection. Also in this embodiment, the device usage event is defined by at least comprising location data, time data, state data, and user data. The usage event is logged in a usage database by establishing a remote wireless connection to the remote central data processing unit. In addition, the remote wireless connection comprises a data connection over a mobile telecommunications network and/or a data connection over a WLAN connection, and the forwarding of the usage event from the device to the remote central data processing unit is initiated after the usage event of the device is defined.

In particular, the connection between the device and the mobile communications device will be initiated by the device, after the device determines the usage event based on a state of the device, whereby the connection between the mobile communications device and the remote exchange data processing unit is initiated by the mobile communication device. In this embodiment, a connection will only be established when the device undergoes a relevant change in state. As a result, the time and the number of times that a connection between the device and mobile communication device is established is reduced to a minimum. In addition, the mobile communication device will only send data to the remote central data processing unit that is deemed relevant. This reduces the number of established communication connections and also minimizes the size of the data to be transferred. Alternatively, the connection between the mobile communications device and the central data processing unit can also be initiated by the device because the usage event to be transmitted from the device to the mobile communications device includes instructions for setting up the connection from the mobile communications device to the central data processing unit and sending the usage event to the central data processing unit.

The connection between the mobile communication device and the device can also be established and initiated by the mobile communication device, based on fixed time periods of connection. In addition, the interval at which the connection is established to retrieve the usage event data can be intensified based on the state of the device. If the device is in standby mode, the next connection will be established with a longer time period than if the device is in active state. In that case, the connection will be established at shorter intervals to retrieve the data of the usage event. When the mobile device then determines that the state of the device corresponds to a predetermined state, for example a period of no activity (i.e. standby), the connection between the mobile communication device and the central data processing unit is set up for the then defined usage event to the central data processing unit.

Preferably, the determination that the device is in an active state is co-determined by a predetermined threshold value. This threshold value must be exceeded before the active state is assumed. This threshold value can be entered on the basis of a minimum range of motion and/or a minimum period of movement. This reduces the chance of an incorrect assumption of the active state.

Not only the start or commencement of use of the device can be determined as such, but also when the use has ended. After all, the sensor will then detect a transition from movement or vibration to a vibration-free state. This defines the end of the usage event. In addition, this preferably initiates the moment at which the communication module can start to send the data over the local wireless connection. In this way, the local wireless connection will only be active when it has been determined that a usage event has been completed. This significantly shortens the transmission time and reduces energy consumption.

The mobile communication device is further preferably arranged to wirelessly configure the communication module of the device. That is, for example, the time, transmission interval, transmission strength and the like can be set remotely. The device can be enrolled as such, either on a manual basis or automatically. On a manual basis, for example, the pulse time, server time or the transmission power for the local wireless connection can be continuously reduced until the connection with the mobile phone is lost. Then the transmission power can be further increased until the connection can be re-established. For the sake of safety, the transmission power of the communication module can then be set to that power at which the connection is reestablished, plus a preset extra power. The power can also be reduced step-by-step through the configuration until a predetermined minimum signal strength is received, the signal strength being determined on the basis of a Received Signal Strength Indicator RSSI.

Preferably, the device's communication module is arranged such that the device is initially discoverable by a discovery mode, after which, once the local wireless connection is established, the device exits the discovery mode, so that the device is exclusively discoverable and accessible for the user of the mobile phone.

Setting up the local and remote wireless connection can also be initiated from the server. The server will then establish a connection with a mobile phone that is in the vicinity of the device. This phone will then establish a local wireless connection to the device.

In addition, the battery condition of the mobile phone can be taken into account in the decision whether it should establish a local connection with the device. This local connection could also be set up via another mobile phone that is within the WPAN range of the device, but whose battery power is above a predetermined level.

The user data is preferably established in the mobile phone. This can be done through the mobile phone number, for example. The identity of the person behind this number is unknown to the users of the system. However, in this way it can be established that someone is using the device, and a distinction can be made between the various users on the basis of the telephone number. Within the scope of the invention it is also possible that other, preferably anonymized, forms of identification can be used. These can be, for example, assigned ID numbers, or unique numbers present in the mobile phone such as an IMEI number.

In order to get the data to the central server, there will have to be a remote wireless connection with the remote central data processing unit or server. This can be done via a WLAN, WiFi, or cellular data network. Mobile phones are equipped for this, but most devices are not. According to the invention, the devices need not be equipped for this either. After all, they set up a local, WPAN (Bluetooth or similar) connection with the mobile phone, which forwards the data to the central server. In this way, on the one hand, the pre-processing (to determine when a usage event starts and has ended) can be efficiently performed by the mobile phone, thereby reducing bandwidth and power consumption of the device. On the other hand, users with mobile phones will always be present in the building and when the device is used. This eliminates the need to install additional hardware that communicates with the devices and ensures that the data reaches the server.

Preferably, the remote wireless data connection includes a connection between the device and at least one further device. This means that for setting up the remote connection, use can be made of a second and/or third or even further device, wherein the next device receives the data from the device to which the data belongs and has been detected, and this forwards to the further device that serves only as a proxy for receiving the mobile communication device, for better coverage of the local wireless infrastructure.

BRIEF DESCRIPTION OF THE DRAWINGS

The invention will be further elucidated on the basis of non-limiting examples which are shown in the figures. The figures show in.

DETAILED DESCRIPTION

Figure 1:
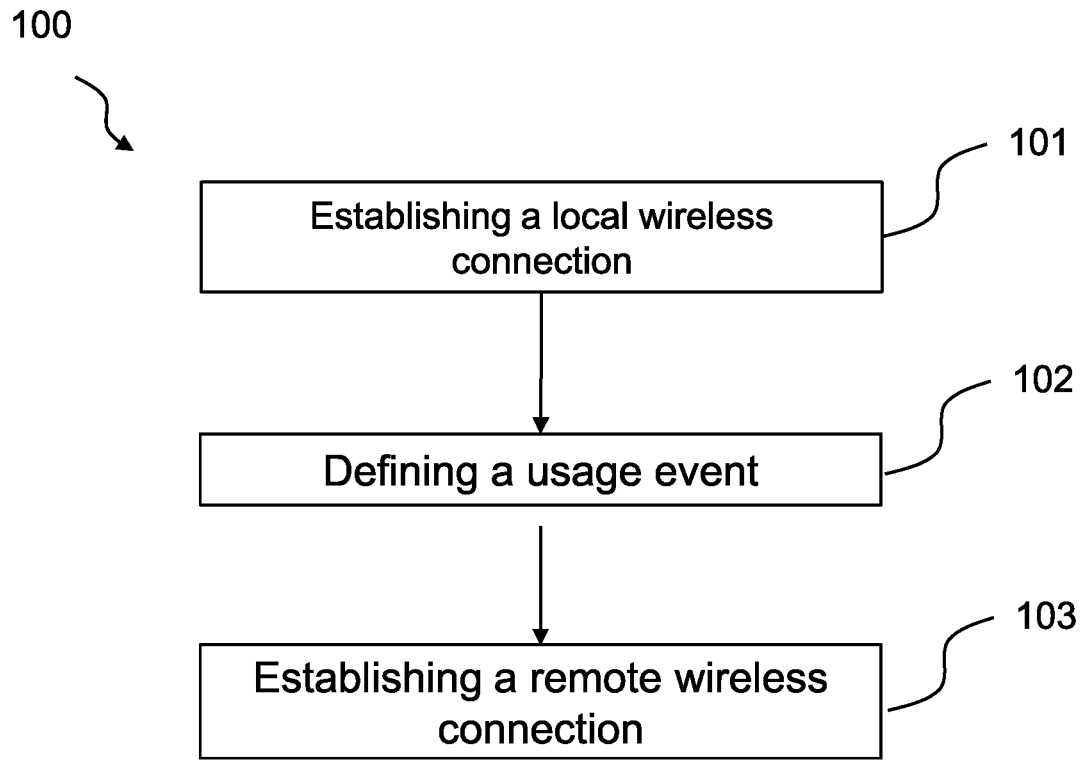
FIG. 1 the steps of recording usage data of a device in a building according to an aspect of the invention.

FIG. 1 shows the various steps 100 of registering usage data of a device in a building.

These steps include at least three steps, 101, 102 and 103. One, more or preferably all of these steps are performed in a mobile communication device such as a mobile phone or a tablet.

In the first step 101, the mobile phone will establish a local connection with a communication module of a device. That appliance is, for example, a household appliance that is located in the building.

The local connection is a Wireless Personal Area Network, WPAN, compliant connection, which is preferably a Bluetooth, Bluetooth LE or other communication protocol with a low energy consumption.

In the second step 102, a device usage event is defined. By usage event it is meant an event that has a defined duration that is determined by a start and an end of use. To this end, the usage event comprises at least location data, time data, state data, and user data.

In the third step 103, a remote wireless connection is established. This connection is a data connection with a remote backend server. By remote is preferably meant that the server is located in a data center, but this can also be a server that is present at or in the vicinity of the location of the device.

Once the remote wireless connection is established, the backend server can log or record the usage event in a usage database. However, the remote wireless link will only initiate the device usage event to the remote central data processing unit after the device usage event has been defined. As a result, transmission only takes place at the moment that the local pre-processing of determining the usage event has been completed. As such, the usage event is sent in its entirety in a momentary communication link to the backend server. The initiation of the sending of the usage event can also be entered on the basis of a movement in the device. By using a vibration sensor, a start and end of the use of the device can be determined, which start and end determine the beginning and end of the use event to be communicated.

Figure 2:
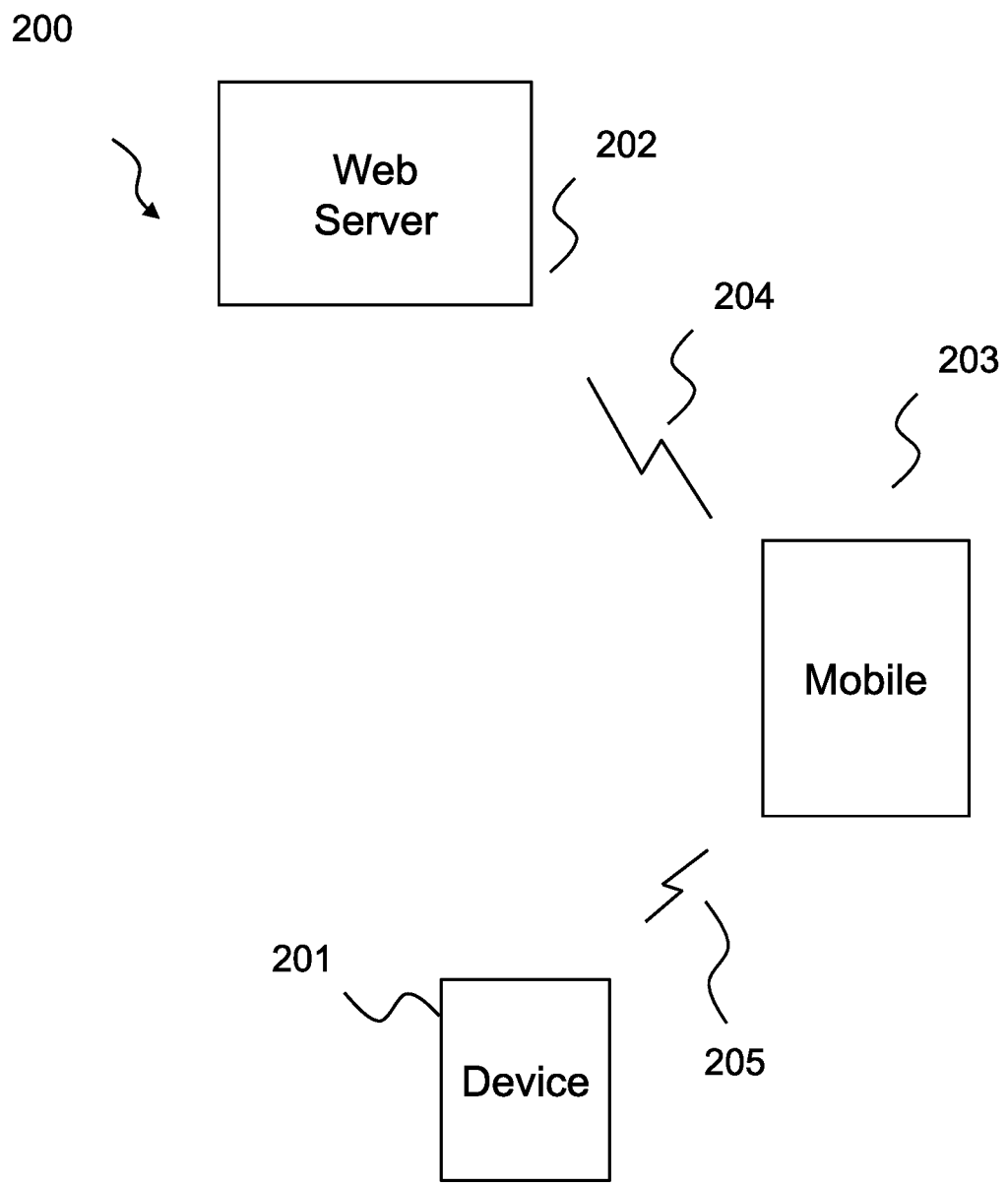
FIG. 2 is a schematic representation of a device, a mobile communication device and a backend server according to an aspect of the invention.

In FIG. 2, the various components 200 of the second aspect of the invention are shown in which the web server or backend server 202 communicates with a mobile phone 203 over a wireless remote connection 204. This connection preferably takes place over a 3G/4G/5G network but can also be set up via the local WiFi network. The mobile phone also has a local communication connection 205 with the device 201. This connection conforms to a WPAN connection, preferably Bluetooth or Bluetooth LE.

The invention claimed is:

1. A method of registering usage data of a device in a building, comprising the steps, performed by a mobile communication device, of:
    establishing a local wireless connection with a communication module of the device, the wireless connection comprising a wireless personal area network (WPAN) compliant connection;
    defining a usage event of the device, comprising at least location data, time data, status data, and user data;
    establishing a remote wireless connection with a remote central data processing unit for logging the usage event in a usage database, the remote wireless connection comprising at least one of a data link over a mobile telecommunications network and a data link over a wireless local area network (WLAN) link; and
    forwarding the usage event to the remote central data processing unit, wherein the step of forwarding the usage event to the remote central data processing unit is initiated after the usage event is defined;
    wherein the device comprises a vibration sensor, and wherein the local wireless connection between the mobile communication device and the communication module of the device is established on the device when the vibration sensor detects movement of the device.

2. The method according to claim 1, wherein the location data is determined by obtaining geolocation data from the device in the building, the geolocation data determined from communication properties of the device with another device or multiple radio frequency (RF) nodes.

3. The method according to claim 1, wherein the time data is determined by at least one of obtaining a time stamp assigned by the device and by the mobile communication device.

4. The method according to claim 1, wherein the status data is determined by at least one of obtaining a current usage status of the device and the mobile communication device.

5. The method according to claim 1, wherein the user data is determined by obtaining anonymous identification data from the mobile communication device.

6. The method according to claim 1, wherein the WPAN compliant connection communicates according to a Bluetooth protocol.

7. The method according to claim 1, wherein the remote wireless data connection comprises a connection of the mobile communication device over a 3G, 4G or 5G network.

8. The method according to claim 1, wherein the remote wireless data connection comprises a connection of the mobile communication device via a WLAN with the internet.

9. The method according to claim 1, wherein defining the usage event occurs when a time interval between a change of state data exceeds a predetermined threshold value.

10. The method according to claim 1, wherein defining the usage event comprises determining that a geolocation of the device relative to a geolocation of the mobile communication device exceeds a predetermined distance from the start of the usage event.

11. The method according to claim 1, wherein the step of forwarding of the usage event of the device to the remote central data processing unit includes only data from a previous usage event.

12. The method according to claim 1, wherein the device is a household appliance, a cleaning appliance, a sales appliance, a lamp or a sensor system.

13. The method according to claim 1, wherein the remote wireless connection comprises a connection between the device and at least one further device.

14. A computer program comprising instructions which, when the program is executed on a computer, cause the computer to perform the steps of the method according to claim 1.

15. A system for registering usage data of a device in a building, comprising:
    at least one device comprising a communication module;
    at least one mobile communication device comprising a communication module configured to establish a local wireless connection with the communication module of the at least one device and establish a remote wireless connection to a remote central data processing unit for logging the usage event in a usage database, the local wireless connection to the at least one device comprising a wireless personal area network (WPAN) compliant connection, and wherein the local wireless connection to the remote central data processing unit comprises at least one of a data connection over a mobile telecommunications network and a data connection over a wireless local area network (WLAN) connection, the at least one mobile communication device further comprising a processing module configured to define the usage event of the at least one device comprising location data, time data, status data, and user data; and
    wherein communication of the usage event from the device to the remote central data processing unit is initiated by the communications module of the at least one mobile communications device after the processing module defines the usage event of the device; and
    wherein the at least one device comprises a vibration sensor and the local wireless connection between the at least one mobile communication device and the communication module of the device is established when the vibration sensor detects movement of the device.

16. A method of registering usage data of a device in a building, comprising the steps, performed by a mobile communication device, of:
    establishing a local wireless connection with a communication module of the device, the wireless connection comprising a wireless personal area network (WPAN) compliant connection;
    defining a usage event of the device, comprising at least location data, time data, status data, and user data;
    establishing a remote wireless connection with a remote central data processing unit for logging the usage event in a usage database, the remote wireless connection comprising at least one of a data link over a mobile telecommunications network and a data link over a wireless local area network (WLAN) link; and
    forwarding the usage event to the remote central data processing unit, wherein the step of forwarding the usage event to the remote central data processing unit is initiated after the usage event is defined;

wherein the user data is determined by obtaining anonymous identification data from the mobile communication device.

17. A method of registering usage data of a device in a building, comprising the steps, performed by a mobile communication device, of:

establishing a local wireless connection with a communication module of the device, the wireless connection comprising a wireless personal area network (WPAN) compliant connection;

defining a usage event of the device, comprising at least location data, time data, status data, and user data;

establishing a remote wireless connection with a remote central data processing unit for logging the usage event in a usage database, the remote wireless connection comprising at least one of a data link over a mobile telecommunications network and a data link over a wireless local area network (WLAN) link; and forwarding the usage event to the remote central data processing unit, wherein the step of forwarding the usage event to the remote central data processing unit is initiated after the usage event is defined;

wherein defining the usage event includes determining that a geolocation of the device relative to a geolocation of the mobile communication device exceeds a predetermined distance from a start of the usage event.

* * * * *

UNITED STATES PATENT AND TRADEMARK OFFICE
CERTIFICATE OF CORRECTION

PATENT NO. : 12,232,071 B2  
APPLICATION NO. : 17/768795  
DATED : February 18, 2025  
INVENTOR(S) : Petrus Joannes Wilhelmus Van Herp and Johannes Hermanus Petrus Maria Oonk Page 1 of 1

It is certified that error appears in the above-identified patent and that said Letters Patent is hereby corrected as shown below:

On the Title Page

Column 1, (72) Inventors, "Johannes Hermanus Petrus Maria Donk, Boxtel (NL)" should read --Johannes Hermanus Petrus Maria Oonk, Boxtel (NL)--.

Signed and Sealed this  
Twenty-seventh Day of January, 2026

John A. Squires  
*Director of the United States Patent and Trademark Office*